UNITED STATES PATENT OFFICE.

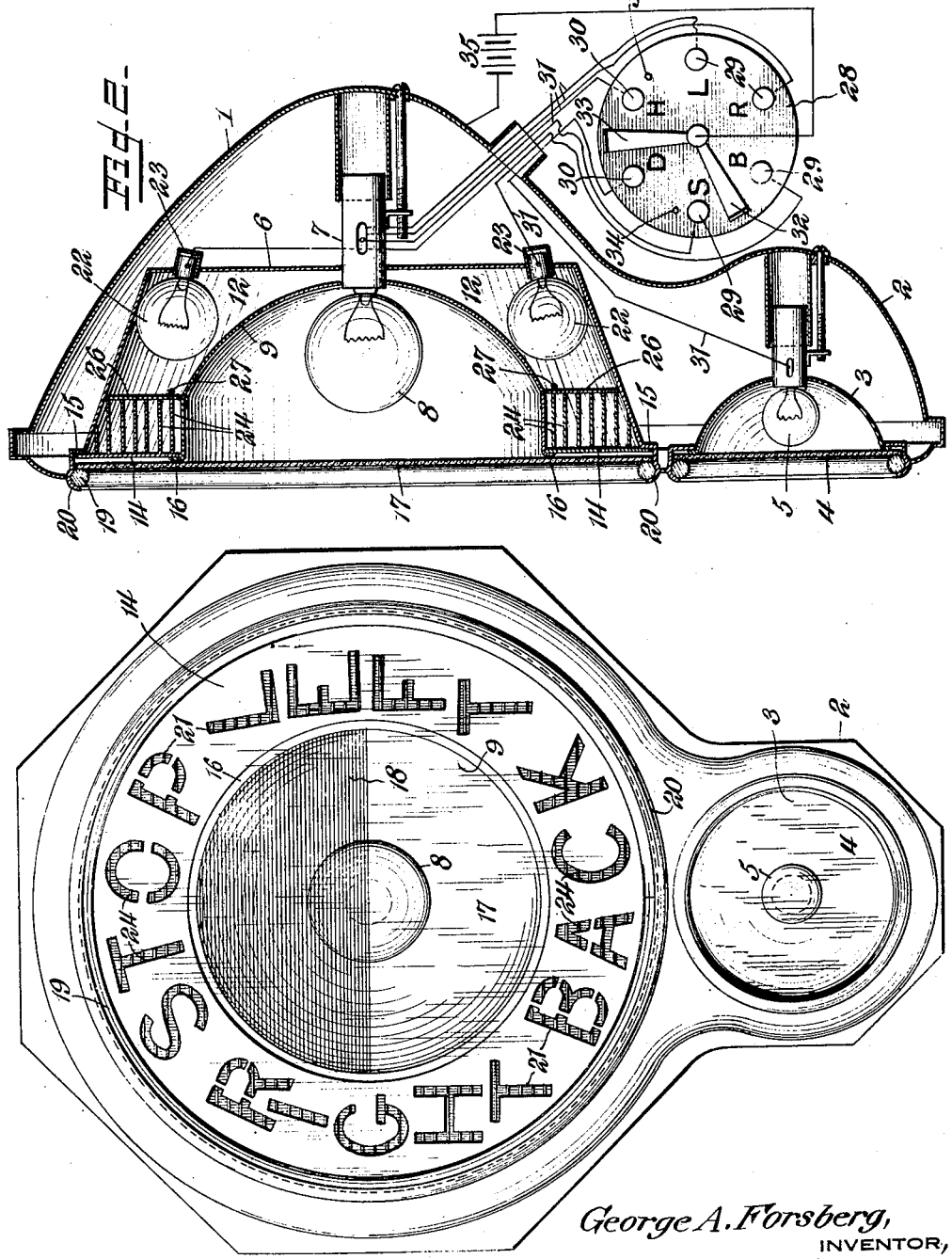

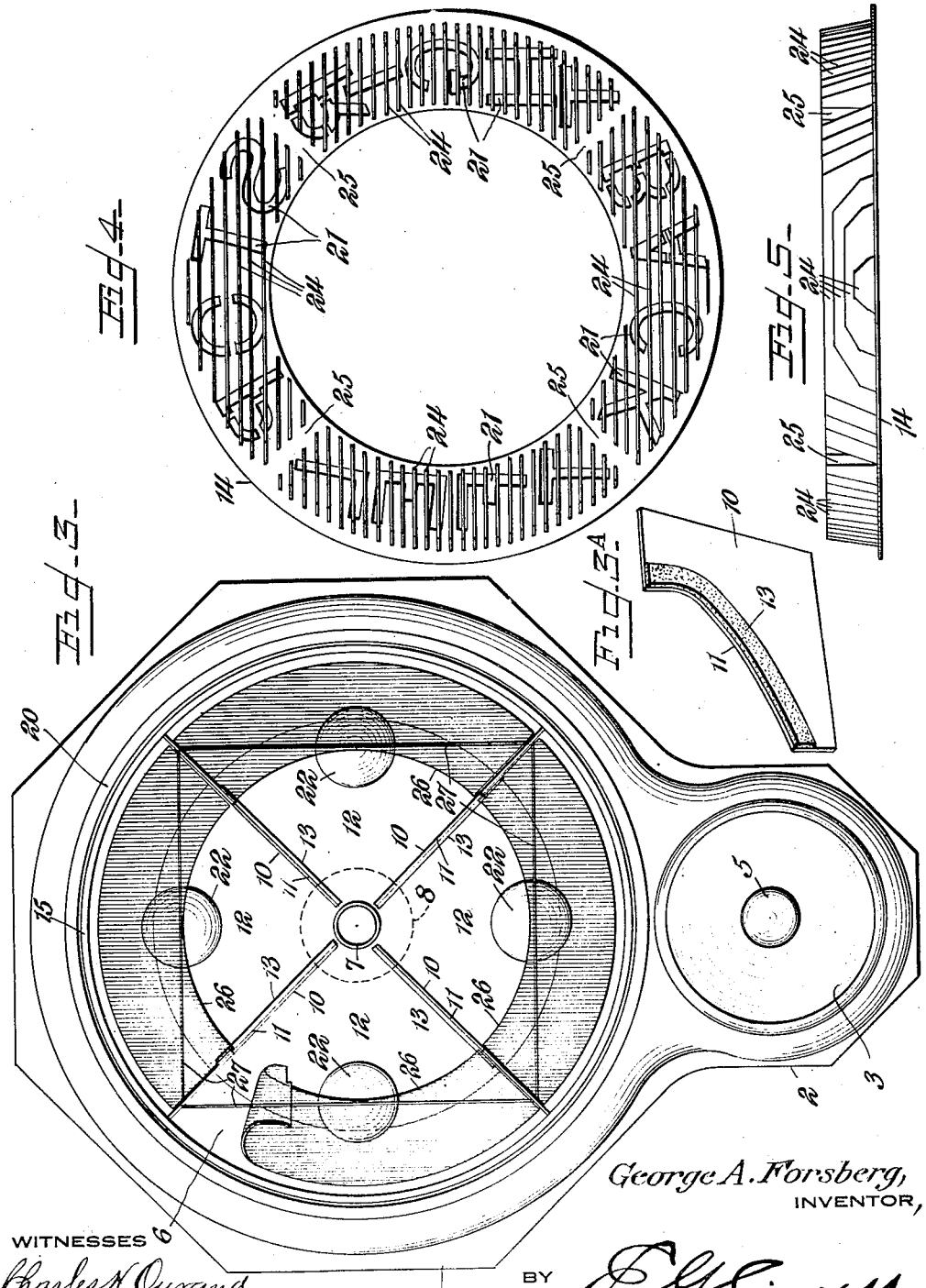

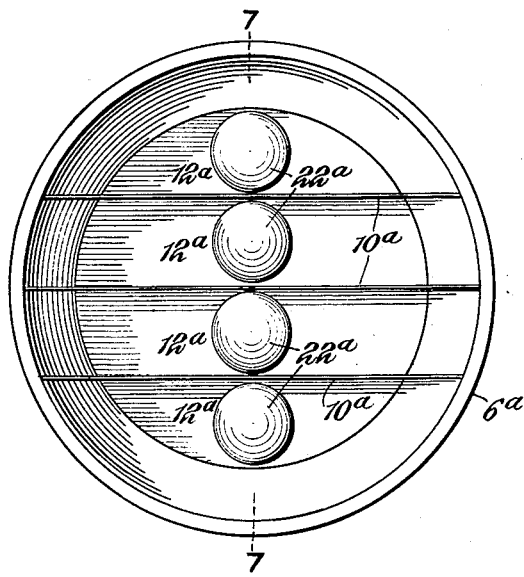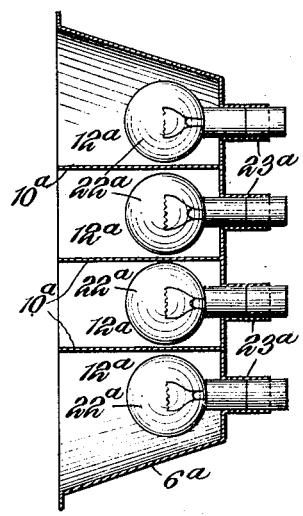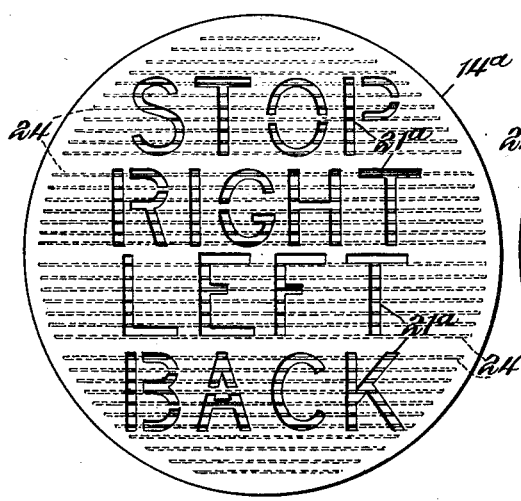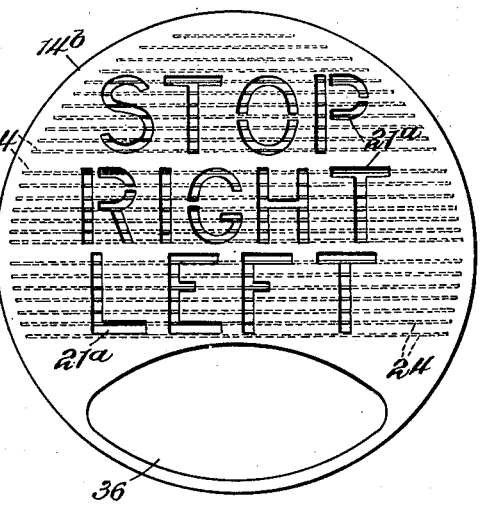

GEORGE ANDREW FORSBERG, OF NEW BRITAIN, CONNECTICUT.

AUTOMOBILE DIRECTION-SIGNAL.

1,351,635.   Specification of Letters Patent.   Patented Aug. 31, 1920.

Application filed November 21, 1919. Serial No. 339,657.

*To all whom it may concern:*

Be it known that I, GEORGE A. FORSBERG, a citizen of the United States, residing at New Britain, in the county of Hartford and State of Connecticut, have invented a new and useful Automobile Direction-Signal, of which the following is a specification.

This invention has reference to automobile direction signals, and its object is to provide an electrically illuminated signal arranged to be visible either by daylight or at night, so that the signal is in effect a 24-hour signal, operatively visible only when illuminating units forming part of the signal are energized.

In accordance with the invention, direction indicia are employed, preferably in the form of words, although by no means confined to such particular forms. These indicia are light transmitting and are backed up by substantially parallel spaced laminæ, behind which light units are placed. The laminæ, which may be made of sheet metal, are blackened or otherwise rendered non-reflecting, especially on those surfaces which would, if reflecting, direct light toward the eye of the observer. The non-reflecting laminæ, therefore, serve to prevent unintentional display of signals which might occur in daylight should the signal device be subjected to the direct effect of sunlight. At the same time, the signals may be selectively displayed in daylight by energizing chosen ones of electric bulbs situated behind the light-transmitting indicia. At night, the laminæ have a more or less diffusive effect upon the light, thus preventing distracting glares which would tend to render the indicia indistinct.

The direction signal arrangement may be used in connection with automobile headlights or tail-lights, or in other situations for which it may be adapted, as, for instance, at street intersections, or the like, for traffic control.

The invention will be best understood from a consideration of the following detailed description taken in connection with the accompanying drawings forming part of this specification, with the understanding, however, that the invention is not confined to any strict conformity with the showing in the drawings, but may be changed and modified so long as such changes and modifications mark no material departure from the salient features of the invention as expressed in the appended claims.

In the drawings,

Figure 1 is a face view of an automobile headlight equipped with the invention.

Fig. 2 is a front-to-rear central section with certain electric connections shown diagrammatically.

Fig. 3 is a face view similar to Fig. 1 but with some parts omitted to show more distant parts.

Fig. 3ª is a perspective view of one of a number of partitions used in the structure.

Fig. 4 is a rear view of an annulus provided with cut-out indicia and laminæ backing the indicia to provide signal elements for the headlight.

Fig. 5 is an edge view of the structure shown in Fig. 4.

Fig. 6 is a face view of a portion of a modified form of signal device.

Fig. 7 is a section on the line 7—7 of Fig. 6.

Fig. 8 is a front view of a face plate for use in connection with the structure of Fig. 6.

Fig. 9 is a similar view of a face plate like that of Fig. 8, but differing therefrom in some respects.

Referring to the drawings, there is shown a headlight casing 1 which, in general construction, may be similar to headlights as ordinarily used on automobiles and other vehicles. Such casing 1 is indicated in the drawings as provided with a drop portion 2 of smaller size for providing a relatively dim illumination for city driving at night. The drop portion 2 of the casing is shown as provided with a relatively small reflector 3 having a window 4 and inclosing an electric bulb 5, all of which may be of ordinary construction and arrangement and therefore requiring no special description.

The casing 1 is arranged to inclose a frusto-conical container 6 in which is centrally located a socket 7 designed to receive and hold an electric bulb 8 properly located in a bowl-shaped reflector 9, the bulb and reflector being such as are usually employed in automobile headlights and arranged to project a powerful beam of light for illuminating a roadway a suitable distance ahead of the automobile.

The reflector 9 is of considerably less diameter than the container 6, leaving an annular space about the large or mouth end of the reflector when the latter is properly installed and centered in the container 6.

Arranged about the reflector 9 and fast in the container 6 is a series of partitions 10 which, in the particular arrangement shown, are equidistantly spaced. The partitions 10 are secured in the container 6 and have the inner edges, that is those toward the center of the headlight and designated as 11, shaped to seat the reflector 9 with a relatively snug fit, thus, in connection with the container 6 and reflector 9, forming a series of compartments 12 in the container 6 about the reflector 9. To avoid leakage of light from one compartment 12 to another, the edge 11 of each partition 10 is provided with a strip 13 of felt or other suitable light-excluding material arranged to engage the back of the reflector 9.

Encircling the reflector 9, within the container 6, is an annulus 14, which may be made of sheet metal, this annulus being seated upon a ledge 15 at the mouth of the container 6 on the outer portion thereof and the annulus 14 is overridden by an outwardly-projecting flange 16 at the mouth end of the reflector 9, so that the reflector tends to hold the inner periphery of the annulus in place. Covering the mouth of the reflector 9 and extending over the mouth of the container 6 is a transparent plate or window 17 which may be conveniently made of glass, with a portion 18 of that part of the glass overlying the reflector 9 frosted or otherwise treated to provide for light diffusion, as is quite customary in headlight structures. The plate or window 17 is held in place by a split elastic ring 19 snapped into a groove 20 in the front of the casing 1.

The annulus 14 has indicia 21 which, in the particular showing of the drawings, constitutes letters grouped into words, the letters being of stencil type cut through the plate. Considering the headlight as an automobile headlight, the indicia 21 may form words corresponding to traffic conditions. For instance, the words "Right", "Left", "Stop" and "Back" may be used, or one or more of the words may be omitted, or the structure may be enlarged to include more than four words.

Each word may be individual to a compartment 12, and in each compartment there is an electric lamp 22 supported by a socket 23 mounted in the rear wall of the container 6.

On the rear face of the annulus 14 are laminæ 24 in relatively close parallel relation and extending horizontally with reference to the installed position of the headlight. The laminæ 24 are grouped in accordance with the spacing of the partitions 10 and compartments 12 so as to each include that portion of the annulus 14 occupied by a word composed of the letters 21, and these groups of laminæ are, at the ends, separated by spaces 25 so located as to receive the corresponding portion of one of the partitions 10, whereby each compartment 12 becomes optically independent of the other compartments, and each compartment has individual to it an electric lamp bulb 22, a direction word, and a group of laminæ 24.

Between the laminæ and the lamps 22 there are placed sheets 26 of some suitable transparent material, and as the signals are indicated to be cautionary, the sheets may be colored red, although such color is by no means obligatory. To support the sheets 26 there are provided wires or strips 27 confining the sheets against the adjacent edges of the laminæ 24.

In order to control the electric lights in the signal structure, there is provided a switch 28 with contact terminals 29 and 30 and conductors 31 leading from each contact 29 and 30 to a respective one of the lamps 5, 8 and 22. The switch is provided with switch arms 32, 33 and stop pins 34 on the switch body to limit the travel of the switch arms. The switch may be mounted at any convenient point for manipulation, with the switch arm 32 having a range of travel to complete the circuit through the lamp 5 or the lamp 8 at will, while the arm 32 has a range of movement to complete the circuit through any one of the lamps 22. In order to facilitate the operation of the switch the contacts 29 and 30 may be designated, say by the first letters of the signal words and by letters descriptive of the main headlight and the small headlights 8 and 5, respectively. Since the lamp 8 represents the headlight, the letter H may designate it on the switch, while the same lamp 5 is designated by the letter D, since such lamp is usually called a dimming lamp, being intended for city driving where a relatively weak or dim lamp is employed. The contacts 29 are designated by the letters S, B, R and L, standing for Stop, Back, Right and Left, which are the capital letters of the words appearing in the annulus 14 about the mouth end of the reflector 9.

When an automobile equipped with the invention is traveling at night along the road where a brilliant headlight is permitted, the switch arm 32 is placed upon the contact 30 indicated by the letter H. This will establish a circuit through the lamp 8, with the result that such lamp is energized by a battery indicated at 35 and which may be either the usual storage battery with which most automobiles are equipped or a special battery. If the automobile be traveling in a city where brilliant lights are not permitted, the switch arm 33 is moved onto the contact 30 indicated by the letter D, whereupon the lamp 5 is energized so that only the dimming light is displayed. Since the switch arm 33 is entirely independent of the switch arm 32, the arm 33 may be left upon either of the contacts 30 while the automobile is either traveling or standing still.

When conditions arise requiring direction signals to be given, the switch arm 32 is moved upon the proper contact 29, thus energizing the lamp 22 behind the proper signal word or indicia, it being evident that some symbol may be employed in place of the indicating words shown in the drawing.

When a lamp or bulb 22 is energized, the corresponding word of the group of indicia is illuminated and an observer is apprised of the intentions of the driver of the automobile carrying the indicating devices, the indications being usually in red on account of the well recognized meaning of the color, so that any one following the traveling automobile or who is approached by an automobile provided with the invention is suitably warned.

The laminæ 24 being interposed between the light-giving elements 22 and the indicia 21, has the advantage of breaking up the light rays in a way to prevent glares or bright spots, which, in the absence of the laminæ, would tend to confuse the words and interfere with the distinctness of the indications, frequently making it difficult to correctly interpret the signal. That part of the device carrying the indicia in the form of light-transmitting letters or the like and carrying the laminæ has such laminæ blackened or otherwise rendered non-reflective so that in the event of light and particularly bright light passing through the letters from front to rear, there will be no such reflection from the laminæ as to illuminate the indicia and so render them visible and consequently give unintentional or false signals.

This permits the intentional use of the signals in daylight. The presence of the laminæ back of the light-transmitting indicia with the surfaces of the laminæ of non-reflective character will prevent the apparent illumination of the indicia, even though subjected to direct sunlight. In daylight, a lamp 22 may be energized and the direction-indicating words through which the light from the energized lamp shines will stand out boldly from the other indicia, so that the word that it is to be intended to display will appear distinctly even when the sun is shining on the device, thus apprising the observer of the course which it is designed the automobile should follow. This makes the signal device a 24-hour device, that is, it will operate in daylight nearly or quite as well as at night, so that the operator is not compelled to use one set of signals for daylight and another set of signals for night travel, but may use the same signals for either day or night.

Where it is desired to employ the signal device without using it in conjunction with the headlight, there is provided a container 6ª, as shown in Figs. 6 and 7, which may be similar in some respects to the container 6 but has no provision for a reflector 9. The container 6ª is divided by a suitable number of partitions 10ª into compartments 12ª, the partitions 10ª being arranged in parallel relation to each other. Each compartment 12ª contains an electric lamp 22ª carried by a suitable socket 23ª. A cover is provided for the container 6ª in the form of a disk 14ª, as in Fig. 8, or 14ᵇ as in Fig. 9, adapted to the container 6ª, it being understood that both the container and the cover disk are in turn contained in a suitable casing, which latter, however, is not shown but may or may not be similar to the casing 1. The disks 14ª or 14ᵇ, as the case may be, have indicia 21ª which may be in the form of stencil cut-outs or may be of any suitable character which will answer the purpose, the indicia being of light transmitting character. The indicia are grouped as in the arrangement shown in Fig. 1, but conform to the compartments 12ª so that each word is individual to a compartment 12ª. On the rear face of the plate 14ª or 14ᵇ, as the case may be, parallel spaced laminæ 24 are secured, the effect being the same as the arrangement shown in Fig. 1 and associated figures. The signal device of Figs. 6 to 9 is particularly adapted for use at the rear of the vehicle. It will be understood that sheets of red transparent material may be employed with the structure of Figs. 6 to 9, in like manner to the arrangement already described with reference to Figs. 1 to 5. The signal device of Figs. 6 to 9 is capable of 24-hour use the same as the signal part of the headlight structure shown in Figs. 1 to 5.

With the signal device of Figs. 6 to 9 employed at the rear of the vehicle, it is frequently desirable to include a red light to burn constantly at night as required by traffic regulations. For this purpose, the lowermost compartment 12ª may be provided with means for emitting a red light which will shine through an opening 36, which may occupy a similar space to that occupied by the lowermost word shown in the plate 14ª of Fig. 8, while the direction signals and other indicia appearing in the structure of Fig. 8 are retained in the structure of Fig. 9.

What is claimed is:

1. A signal device comprising intelligible light-transmitting indicia arranged to impart intelligible signals, light-emitting means individual to each signal for differentiating one signal from another, and groups of laminæ individual to the signal indicia and located between the light-transmitting signal and the light-emitting means with the edges of the laminæ presented toward the indicia and toward the light-emitting means and of non-reflecting character, whereby the signal means may be used successfully either by daylight or at night.

2. A signal device comprising a container with walls dividing the interior of the container into compartments separated optically one from the other, each compartment containing light-emitting means, a front wall with light-transmitting indicia therein grouped to display an intelligible signal, and groups of laminæ in and individual to compartments interior to the outer wall and related to the light-emitting means to prevent the reflection of light entering the indicia from the outside through said indicia to the outside.

3. A signal device comprising a container with walls dividing the interior of the container into compartments separated optically one from the other, each compartment containing light-emitting means, a front wall with light-transmitting indicia therein grouped to display an intelligible signal, and groups of laminæ in and individual to the compartments interior to the outer wall and related to the light-emitting means to prevent the reflection of light entering the indicia from the outside through said indicia to the outside, the laminæ being in superposed spaced horizontal position when installed, and having the surfaces substantially non-reflective.

4. A signal device comprising a container with optically distinct compartments therein, a front or cover with light-transmitting indicia representing intelligible signals and each individual to a compartment, and a group of non-reflective spaces and substantially parallel laminæ adjacent to the inner face of the cover and projecting toward the source of light in, and each group being individual to, the compartment, whereby the signal may be caused by the energization of the light source either in daylight or at night.

5. A signal device comprising a container with interior division walls separating the container in optically distinct compartments therein, light-emitting means in each compartment individual thereto, and cover means for the compartments in the form of a plate with light-transmitting indicia therein providing intelligible signals, said plate having on its rear face groups of closely adjacent spaced laminæ projecting perpendicularly and individual to the indicia between the cover means and the light-emitting means in each compartment.

6. A signal device comprising a container with partitions therein dividing the container into optically separate compartments, cover means of opaque material for the container, with openings therethrough defining intelligible indicia of light-transmitting character, light-emitting means in each compartment of the container individual thereto, and groups of closely associated substantially parallel laminæ on the rear face of the cover means and between the indicia and the light-emitting means of each compartment, said groups being individual to the indicia.

7. A signal device comprising a container with partitions therein dividing the container into optically separate compartments, cover means of opaque material for the container, with openings therethrough defining intelligible indicia of light-transmitting character, light-emitting means in each compartment of the container individual thereto, and groups of closely associated substantially parallel laminæ on the rear face of the cover means with each group individual to and between the indicia and the light-emitting means of each compartment, said laminæ being extended horizontally in the installed position of the container.

8. A signal device comprising a casing, a container therein with partitions separating the container into compartments, a reflector seated in the container, said partitions being shaped to conform to the reflector and the latter being spaced from the walls of the container and spaced peripherally therefrom, an annular plate between the peripheral portion of the reflector and the adjacent walls of the container to form a cover for the compartments about the reflector with said plate having light-transmitting indicia for imparting information to an observer, spaced laminæ on the inner wall of the plate and extending across the light-transmitting indicia, and light-emitting means located in the reflector and in the compartments surrounding the reflector.

9. A signal device comprising a casing, a container therein with partitions separating the container into compartments, a reflector seated in the container, said partitions being shaped to conform to the reflector and the latter being spaced from the walls of the container and spaced peripherally therefrom, an annular plate between the peripheral portion of the reflector and the adjacent walls of the container to form a cover for the compartments about the reflector with said plate having light-transmitting indicia for imparting information to an observer, spaced laminæ on the inner wall of the plate and extending across the light-transmitting indicia, and light-emitting means located in the reflector and in the compartment surrounding the reflector, said laminæ being located to extend horizontally in the installed position of the signal device with the surfaces of the laminæ of substantially non-reflecting character.

10. A signal device comprising a casing, a container in the casing with partitions dividing the casing into a circular series of compartments directed toward the front of the casing with the partitions having curved outer edges, a bowl-shaped reflector engaging the outer edges of the partitions and stopping short of the margin of the container to there provide an annular space, an annular plate covering the space between the outer periphery of the reflector and the inner periphery of the container with said annular plate having light-transmitting indicia therein intelligible to an observer, substantially parallel laminæ on the inner wall of the annular plate and extending across the indicia and of substantially non-reflecting character, and light-emitting elements in each compartment and in the reflector.

11. A signal device comprising a casing, a container in the casing with partitions dividing the casing into a circular series of compartments directed toward the front of the casing with the partitions having curved outer edges, a bowl-shaped reflector engaging the outer edges of the partitions and stopping short of the margin of the container to there provide an annular space, an annular plate covering the space between the outer periphery of the reflector and the inner periphery of the container with said annular plate having light-transmitting indicia therein intelligible to an observer, substantially parallel laminæ on the inner wall of the annular plate and extending across the indicia and of substantially non-reflecting character, and light-emitting elements in each compartment and in the reflector, the light-emitting elements having controlling means associated therewith whereby to energize any one of the light-emitting elements in the compartments and the light-emitting elements in the reflector at the will of an operator.

12. A signal device comprising a casing, a container in the casing with partitions dividing the casing into a circular series of compartments directed toward the front of the casing with the partitions having curved outer edges, a bowl-shaped reflector engaging the outer edges of the partitions and stopping short of the margin of the container to there provide an annular space, an annular plate covering the space between the outer periphery of the reflector and the inner periphery of the container with said annular plate having light-transmitting indicia therein intelligible to an observer, substantially parallel laminæ on the inner wall of the annular plate and extending across the indicia and of substantially non-reflecting character, and light-emitting elements in each compartment and in the reflector, the light-emitting elements having controlling means associated therewith whereby to energize any one of the light-emitting elements in the compartments and the light-emitting element in the reflector at the will of an operator, each compartment being provided with colored light-transmitting means whereby the indicia as illuminated by the light-emitting elements appear similarly colored.

13. The combination of an inner reflector, an outer concentric reflector having its margin spaced from the margin of the inner reflector, thereby to provide an annular clearance, a series of radially arranged partitions dividing the space between the two reflectors into compartments, a signal lamp in each compartment, and a plate extending across the compartments and serving to transmit the rays of the signal lamps in characteristic fashion, effective for signaling purposes.

14. The combination of an inner reflector, a lamp fitted therein for illuminating purposes, a concentric outer reflector inclosing the inner reflector, said reflectors having an annular clearance between the front margins, signal lamps fitted in the outer reflector, a plate fitted in said clearance for transmitting the rays of the signal lamps in characteristic fashion, effective for signaling purposes, and means arranged in said clearance for passing the rays from the signal lamps and intercepting the rays of the sun.

In testimony that I claim the foregoing as my own I have hereto affixed my signature in the presence of two witnesses.

GEORGE ANDREW FORSBERG.

Witnesses:
 PAUL H. VOGEL,
 BEDA HEDBERG.